(12) United States Patent
Qiu

(10) Patent No.: US 9,982,657 B2
(45) Date of Patent: May 29, 2018

(54) WIND-DIRECTLY-DRIVEN OIL PUMPING MACHINE

(71) Applicant: Yongan Qiu, Huzhou (CN)

(72) Inventor: Yongan Qiu, Huzhou (CN)

( * ) Notice: Subject to any disclaimer, the term of this patent is extended or adjusted under 35 U.S.C. 154(b) by 855 days.

(21) Appl. No.: 14/362,183

(22) PCT Filed: Dec. 17, 2012

(86) PCT No.: PCT/CN2012/086741
§ 371 (c)(1),
(2) Date: Jun. 2, 2014

(87) PCT Pub. No.: WO2013/104233
PCT Pub. Date: Jul. 18, 2013

(65) Prior Publication Data
US 2014/0334950 A1  Nov. 13, 2014

(30) Foreign Application Priority Data

Jan. 10, 2012 (CN) .......................... 2012 1 0007470

(51) Int. Cl.
*F03D 9/00* (2016.01)
*E21B 43/12* (2006.01)
(Continued)

(52) U.S. Cl.
CPC ............ *F03D 9/003* (2013.01); *E21B 43/126* (2013.01); *F03D 9/12* (2016.05); *F03D 9/255* (2017.02);
(Continued)

(58) Field of Classification Search
CPC ....................................... F03D 15/10
See application file for complete search history.

(56) References Cited

U.S. PATENT DOCUMENTS 1,495,804 A  *  5/1924  Roberts .................... F03D 15/10
                                                            416/32
1,722,845 A  *  7/1929  Gonzalez ................ F03D 15/10
                                                            417/35
(Continued)

FOREIGN PATENT DOCUMENTS

SU            1366688 A1  *  1/1988

*Primary Examiner* — Jennifer H Gay
(74) *Attorney, Agent, or Firm* — Kratz, Quintos & Hanson, LLP

(57) ABSTRACT

The present invention provides a wind-directly-driven oil pumping machine, comprising an electric motor (1) and a control device (14), and further comprising a rotary spindle (2), a blade (3), a lifting roller (4), a roller driving wheel (6), an energy adjustment flywheel (7), a generator (10), a transmission (8) and an energy feedback device (9). The blade (3) is fixedly connected to the rotary spindle (2). The lifting roller (4) is used for raising and lowering a sucker rod. The lifting roller (4) sleeves the rotary spindle (2). Clutches (5) are disposed between the rotary spindle (2) and the lifting roller (4). The clutches (5) are used for separating or joining the rotary spindle (2) and the lifting roller (4). The roller driving wheel (6) and the lifting roller (4) are fixedly connected to form a whole. The wind-directly-driven oil pumping machine is simple in structure, cheap, low in energy consumption, high in efficiency, stable in operation, and low in failure rate, and incurs no pollution to the power grid, thereby utilizing the wind energy efficiently and improving main performance indicators of the oil pumping machine.

9 Claims, 7 Drawing Sheets

(51) Int. Cl.
  *F03D 15/10* (2016.01)
  *F03D 9/12* (2016.01)
  *F03D 9/28* (2016.01)
  *F03D 9/25* (2016.01)
  *F04B 47/02* (2006.01)

(52) U.S. Cl.
  CPC ............... *F03D 9/28* (2016.05); *F03D 15/10* (2016.05); *F04B 47/02* (2013.01); *Y02E 10/72* (2013.01); *Y02E 60/16* (2013.01)

(56) References Cited

U.S. PATENT DOCUMENTS

| | | | | |
|---|---|---|---|---|
| 3,970,409 | A * | 7/1976 | Luchuk | F03D 7/06 415/4.3 |
| 4,249,867 | A * | 2/1981 | Cunningham | F04B 17/02 417/334 |
| 4,392,785 | A * | 7/1983 | Avery | F03D 15/15 416/169 R |
| 4,427,342 | A * | 1/1984 | Sutz | F03D 15/10 416/170 R |
| 4,507,060 | A * | 3/1985 | Sutz | F03D 7/0208 416/170 R |
| 4,576,064 | A * | 3/1986 | Kentfield | F04B 17/02 417/218 |
| 4,784,570 | A * | 11/1988 | Bond | F03D 15/15 416/170 R |
| 5,174,724 | A * | 12/1992 | Ammons | F03D 3/065 290/44 |
| 5,366,342 | A * | 11/1994 | Sutz | F03D 7/0212 416/12 |
| 5,827,051 | A * | 10/1998 | Smith | E21B 47/0008 417/375 |
| 6,863,505 | B2 * | 3/2005 | Dietz | F04B 35/00 417/218 |
| 8,810,057 | B2 * | 8/2014 | Krietzman | H02P 9/04 290/55 |
| 2004/0140272 | A1 * | 7/2004 | Litherland | B01D 17/0214 210/776 |
| 2010/0013237 | A1 * | 1/2010 | Jones | F03D 7/04 290/55 |
| 2010/0135767 | A1 * | 6/2010 | Arduini | F16D 41/12 415/1 |
| 2010/0232988 | A1 * | 9/2010 | Creighton | F03D 5/00 417/334 |
| 2011/0201470 | A1 * | 8/2011 | Durnin | F16H 3/72 475/149 |
| 2012/0045335 | A1 * | 2/2012 | Heidenreich | F03D 11/02 416/170 R |
| 2012/0114481 | A1 * | 5/2012 | Benitez Sanchez | F03D 7/0248 416/1 |
| 2012/0147637 | A1 * | 6/2012 | Petter | H02J 3/24 363/74 |
| 2013/0043679 | A1 * | 2/2013 | Nomoto | F03D 1/04 290/44 |
| 2013/0251499 | A1 * | 9/2013 | Rampen | F03D 9/001 415/1 |
| 2014/0252774 | A1 * | 9/2014 | Boaventura-Delanoe | F03D 9/007 290/55 |
| 2014/0334950 | A1 * | 11/2014 | Qiu | E21B 43/126 417/410.1 |
| 2016/0061013 | A1 * | 3/2016 | Hammer | E21B 43/127 417/334 |

* cited by examiner

WIND-DIRECTLY-DRIVEN OIL PUMPING MACHINE

TECHNICAL FIELD

The present invention relates to the technical field of oil field production equipment, more particularly to a wind-directly-driven oil pumping machine.

BACKGROUND OF THE INVENTION

The working principle of an oil pumping machine with a sucker rod is pumping petroleum out from an oil well through the vertical up-and-down movement of the sucker rod. An existing oil pumping machine with a sucker rod generally comprises a speed reducer, a balance system, a reversing device and various mechanical driving devices. The energy transfer way of such an existing oil pumping machine with a sucker rod is: electric motor-belt wheel-speed reducer-balance system-reversing device-various mechanical driving devices, etc. There are many transfer links, resulting in high energy consumption and serious waste. During the operating of such oil pumping machines, the work done by the oil pumping machines is not uniform due to their structural features. In the up-and-down stroke of such an oil pumping machine, the energy required by the sucker rod varies greatly, while the output power of the electric motor must correspond to the power required by the movement of the sucker rod. Specifically, the power of the electric motor must meet the maximum power in the up-and-down stroke. Therefore, the installed capacity of the electric motor is large, generally multiple times larger than an actually required average power, and even above 7 times. Meanwhile, due to the starting characteristics of the electric motor, there is a large impact to the power grid, thereby causing serious pollution to the power grid. A Chinese Utility Model CN200982182Y, published on Nov. 28, 2007, disclosed such an oil pumping machine.

Under the condition of on-grid wind power, the energy transfer way of an existing wind power generation system is: wind energy-transmission-generator-controller-converter-power grid-loads; while under the condition of off-grid wind power, the energy transfer way of the existing wind power generation system is: wind energy-transmission-generator-controller-storage batteries-inverter-loads. A considerable part of the captured wind energy will be consumed during the multi-link transfer, resulting in low equipment efficiency. As current flows from high voltage to low voltage only, the output voltage of the electric motor is lower than the voltage of the power grid or storage batteries when the existing wind power is at a wind speed of 3-4 m/s. Although the wind energy can generate electricity, the electricity cannot be utilized. The utilization ratio of wind energy is low. Due to the instability of wind energy, the output current and voltage are instable, and a great impact is thus generated to wind power equipment. As a result, the technical difficulty and failure rate are increased, and the reliability is lowered.

SUMMARY OF THE INVENTION

In view of the deficiencies in the prior art, an object of the present invention is to provide a wind-directly-driven oil pumping machine, which is simple in structure, cheap, small in volume, light in weight, small in the installed capacity of the electric motor, low in energy consumption, high in efficiency, stable in operation, and low in failure rate, and incurs no pollution to the power grid and utilizes the wind energy efficiently.

To solve the above technical problem, the present invention employs the following technical solution: a wind-directly-driven oil pumping machine is provided, comprising an electric motor and a control device, and further comprising a rotary spindle;

a blade, fixedly connected to the rotary spindle;

a lifting roller, used for raising and lowering a sucker rod, sleeving the rotary spindle, the separation or join of the rotary spindle with the lifting roller being realized via clutches;

a roller driving wheel, the roller driving wheel and the lifting roller being fixedly connected to form a whole;

an energy adjustment flywheel;

a transmission, a low-speed end of which is connected to the rotary spindle while a high-speed end of which is connected to the energy adjustment flywheel;

an energy feedback device, used for transferring, to the energy adjustment flywheel via the transmission, energy generated during lowering the sucker rod, to realize the accelerated rotation of the energy adjustment flywheel for energy storage, the energy of the energy adjustment flywheel being able to be transferred to the lifting roller for raising the sucker rod when the lifting roller raises the sucker rod; and a generator, connected to the high-speed end of the transmission.

In the case that the idea about energy conservation and environmental protection has spread into every corner of the society, how to realize energy conservation and environmental protection is very important for oil pumping machines. As a pollution-free, renewable and unlimited energy source, wind energy can be applied to oil pumping machines absolutely. In the wind-directly-driven oil pumping machine provided by the present invention, as the rotary spindle is connected to the low-speed end of the transmission while the energy adjustment flywheel is connected to the high-speed end of the transmission, by driving the rotary spindle to rotate via the blade, the wind energy can be utilized at a wind speed of 3-4 m/s or even lower. During the operating of the oil pumping machine, the potential energy of the sucker rod during its down stroke is transferred to the energy adjustment flywheel via the energy feedback device, and then converted by the energy adjustment flywheel into the accelerated rotation of the energy adjustment flywheel, so that the energy is stored. Meanwhile, the energy feedback device may control the speed of the sucker rod during the down stroke, thereby making the down stroke of the sucker rod very stable and decreasing the impact. During the up stroke of the sucker rod, the sucker rod is driven to rise through the rotational energy of the energy adjustment flywheel, thus to release energy. In this way, the output power of the electric motor does not have to correspond to the instant power consumption of the sucker rod during rising of the sucker rod. Therefore, the power of the electric motor can almost get close to a theoretical minimum value, thereby greatly reducing the installed capacity of the electric motor, making the power output more stable, decreasing the impact to the power grid, and greatly reducing the pollution to the power grid. In addition, the oil pumping machine provided by the present invention is not provided with a balance system, a four-bar linkage and other essential members of an existing oil pumping machine, so its structure is simple, both its size and weight are reduced greatly, and its reliability is enhanced greatly. Meanwhile, first, the oil pumping machine provided by the present invention realizes the efficient utilization of the wind energy, so that it may work normally at a high wind speed, and may utilize the wind energy at a wind speed of 3-4 m/s or even lower. Then, there are just few intermediate links from wind energy to loads, so the energy consumption is low. When at a high wind speed, beyond the need of the oil pumping machine itself, the surplus wind energy may be converted into electric energy by the generator.

As a preferred technical solution of the present invention, the energy feedback device comprises a driving shaft and a first driving wheel and a second driving wheel disposed on the driving shaft, the first driving wheel or the second driving wheel being connected to the driving shaft via an energy feedback clutch, the first driving wheel and the roller driving wheel being a pair of meshed gears, the second driving wheel being connected to the transmission.

As a preferred technical solution of the present invention, the energy feedback device comprises a rotating shaft, a first driving wheel and a second driving wheel, the rotating shaft being connected to the second driving wheel via an energy feedback clutch, all the first driving wheel, the second driving wheel and the roller driving wheels being gears, the first driving wheel being positioned between the roller driving wheel and the second driving wheel and being meshed with both the roller driving wheel and the second driving wheel, the second driving wheel being connected to the transmission.

As a preferred technical solution of the present invention, the energy feedback device comprises a driving shaft and a first driving wheel, the driving shaft being connected to the first driving wheel via an energy feedback clutch, the first driving wheel being connected to the roller driving wheel via a driving belt.

As a preferred technical solution of the present invention, the energy feedback device comprises a driving shaft, a transition wheel fixedly connected to the rotary spindle, and a first driving wheel and a second driving wheel disposed on the driving shaft, the first driving wheel or the second driving wheel being connected to the driving shaft via an energy feedback clutch, the first driving wheel and the roller driving wheel being a pair of meshed gears, the second driving wheel being connected to the transition wheel via a driving belt.

As a preferred technical solution of the present invention, the energy feedback device comprises a driving shaft, a transition wheel fixedly connected to the rotary spindle, and a first driving wheel and a second driving wheel disposed on the driving shaft, the first driving wheel or the second driving wheel being connected to the driving shaft via an energy feedback clutch, the second driving wheel and the transition wheel being a pair of meshed gears, the first driving wheel being connected to the roller driving wheel via a driving belt.

As a preferred technical solution of the present invention, the energy feedback device comprises a driving shaft, a transition wheel fixedly connected to the rotary spindle, and a first driving wheel and a second driving wheel disposed on the driving shaft, the first driving wheel or the second driving wheel being connected to the driving shaft via an energy feedback clutch, all the first driving wheel, the second driving wheel and the roller driving wheel being gears, the first driving wheel being meshed with the roller driving wheel, the transition wheel being provided with internal teeth, the second driving wheel being meshed with the internal teeth.

As a preferred technical solution of the present invention, an electric motor gear, meshed with the internal teeth, is mounted on the output shaft of the electric motor; or, the output shaft of the electric motor is connected to the transmission via an electric motor clutch.

As a preferred technical solution of the present invention, the energy feedback clutch is an overrun clutch.

The energy feedback clutch may be a mechanical clutch, for example, the whole clutch is divided into a fixed portion and a slide portion which can be engaged with each other. The slide portion may be pushed by an oil cylinder or air cylinder, so that the slide portion is joined with the fixed portion. If the energy feedback clutch is an overturn clutch, the structure of the whole energy feedback device is simpler, and standard components may be purchased directly.

As a preferred technical solution of the present invention, the energy generated during lowering the sucker rod is transferred to the energy adjustment flywheel via the transmission to realize the accelerated rotation of the energy adjustment flywheel; or, the energy generated during lowering the sucker rod passes through the rotary spindle first and is then transferred to the energy adjustment flywheel via the transmission to realize the accelerated rotation of the energy adjustment flywheel.

As an important component of the wind-directly-driven oil pumping machine provided by the present invention, the energy feedback device can transfer the energy generated during lowering the sucker rod to the energy adjustment flywheel, and then the energy is converted into the accelerated rotation of the energy adjustment flywheel to realize energy storage. Therefore, transfer links should be reduced as less as possible, in order to improve the efficiency and lower the failure rate. The two transfer ways mention above have few intermediate links and high efficiency.

The present invention has the following advantages:

1. The oil pumping machine has simple structure, high efficiency, small installed capacity of the electric motor, no pollution to the power grid, low failure rate and high reliability;

2. The oil pumping machine utilizes the wind energy efficiently, and has few intermediate transfer links, stable operation and no impact; moreover, the oil pumping machine may utilize the wind energy even at a low wind speed, and may utilize the wind energy beyond the need to generate electricity via the generator when at a high wind speed; in addition, the defects resulted from the instability of wind energy are overcome, and the stable operation of the oil pumping machine will not be influenced by the change of the wind speed;

3. The overall structure of the oil pumping machine is simplified greatly, so a large amount of steel is saved, the cost is reduced, and the competitiveness is enhanced; the oil pumping machine is small in size, so it is convenient for transportation and installation; in addition, the whole oil pumping machine may be protected with a housing, so the protection of the oil pumping machine is improved;

4. With strong adaptability, the oil pumping machine may be applied to regular oil wells or heavy oil recovery; and it may be applied to oil recovery at both land and sea; and 5. A good combination of energy-saving and emission reduction with efficient utilization of the wind energy is achieved, so that the wind energy is utilized efficiently, and the energy consumed by the operating of the oil pumping machine can be reduced.

BRIEF DESCRIPTION OF THE DRAWINGS

The present invention will be further described as below with reference to accompanying drawings.

In the figures.

1—Electric motor; 2—Rotary spindle; 3—Blade; 4—Lifting roller; 5—Clutch; 6—Roller driving wheel; 7—Energy adjustment flywheel; 8—Transmission; 9—Energy feedback device; 901—Driving shaft; 902—Transition wheel; 902a—Internal teeth; 903—First driving wheel; 904—Second driving wheel; 905—Energy feedback clutch; 906—Driving belt; 10—Generator; 11—Generator clutch; 12—Electric motor clutch; 13—Electric motor gear; and, 14—Control device.

DETAILED DESCRIPTION OF THE INVENTION

The following description just illustrates preferred embodiments of the present invention, and is not intend to limit the scope of the present invention.

Embodiment 1

Figure 1:
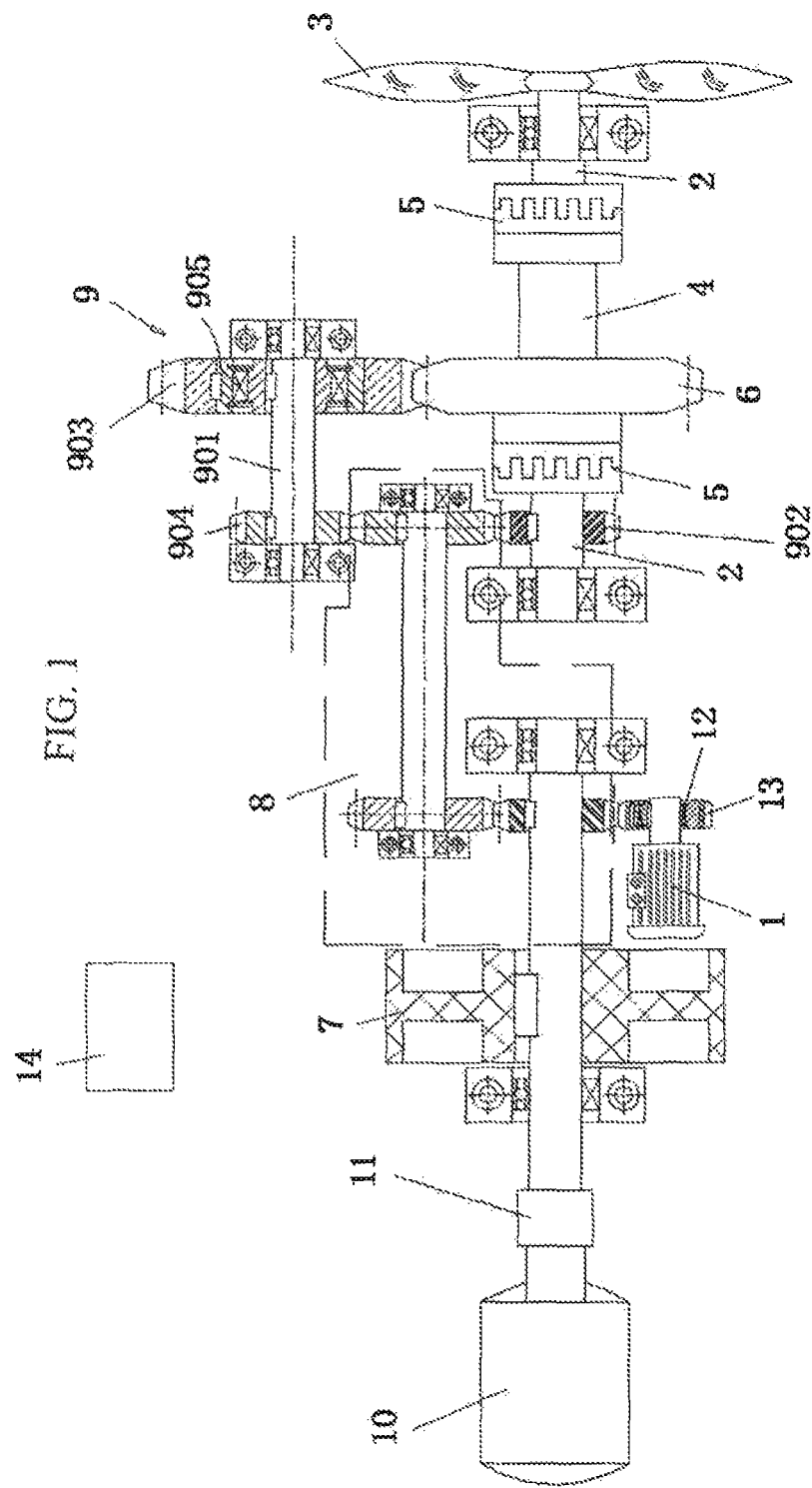
FIG. 1 is a structure diagram of Embodiment 1 of the present invention.

Referring to FIG. 1, a wind-directly-driven oil pumping machine comprises an electric motor 1 and a control device 14, and further comprises a rotary spindle 2, a blade 3, a lifting roller 4, a roller driving wheel 6, an energy adjustment flywheel 7, a transmission 8, an energy feedback device 9 and a generator 10. The control device 14 comprises a PLC controller, a position switch, a connection cable, etc., and is used for controlling the action of the whole oil pumping machine. The electric motor 1 may be a general electric motor or a variable-frequency electric motor. The rotary spindle 2 is an integral spindle. Of course, the rotary spindle 2 may be one formed by integrating a plurality of split spindles via couplers or by welding or in other manners.

The blade 3 is connected to the rotary spindle 2 fixedly or via an overrun clutch, so that the blade 3 drives the rotary spindle 2 to rotate by wind power. The lifting roller 4 is connected to a sucker rod (not shown) via a soft connector. The sucker rod is driven to rise by the forward rotation of the lifting roller 4, while the sucker rod drives the lifting roller 4 to rotate reversely during lowering the sucker rod, so that an up stroke and a down stroke of the whole oil pumping machine are completed, and the oil pumping work is thus completed. The lifting roller 4 sleeves the rotary spindle 2, so that the relative rotation can be generated between the lifting roller 4 and the rotary spindle 2. The rotary spindle 2 is separated from or joined with the lifting roller 4 via clutches 5. The clutches 5 may be electromagnetic clutches, friction clutches, hydraulic clutches or other known clutches. In this embodiment, the clutches 5 are mechanical clutches, and there are total two clutches 5 disposed at two ends of the lifting roller 4. Of course, there may be only one clutch 5. Each clutch 5 includes two portions, one of which is a fixed portion directly fixed on the lifting roller 4, while the other one is a slide portion connected to the rotary spindle 2 in a form of spline. The two portions are provided with a neck and a latch, which are engaged with each other. Pushed by an air cylinder, an oil cylinder or other devices, the slide portion may slide left and right in the axial direction, thereby realizing the join (separation) of the lifting roller 4 with (from) the rotary spindle 2. The roller driving wheel 6 is fixedly connected to the lifting roller 4 by welding, screwing or other known fixing manners. The transmission 8 may be in many forms. The transmission 8 may be a two-stage, three-stage, four-stage or five-stage transmission, or a continuously variable transmission, or a comprehensive transmission. However, no matter in which form, the transmission 8 has a low-speed end and a high-speed end. The low-speed end of the transmission 8 is connected to the rotary spindle 2, so that the rotation speed of the rotary spindle 2 is relatively low, usually dozens of revolutions per minute; and the high-speed end of the transmission 8 is connected to the energy adjustment flywheel 7. After the energy adjustment flywheel 7 is connected to the high-speed end, its rotation speed is very high and may reach hundreds of revolutions and even thousands of revolutions per minute. The energy adjustment flywheel 7 may be directly fixed on the shaft at the high-speed end of the transmission 8, or, disposed on the shaft specially and then connected to the shaft at the high-speed end of the transmission 8. The generator 10 is connected to the high-speed end of the transmission 8 via a generator clutch 11.

The energy feedback device 9 is used for transferring, to the energy adjustment flywheel 7, energy generated during lowering the sucker rod, to realize the accelerated rotation of the energy adjustment flywheel 7. Then, the energy of the energy adjustment flywheel 7 is transferred to the lifting roller 4 for raising the sucker rod, when the lifting roller 4 raises the sucker rod. The energy feedback device 9 at least comprises a driving shaft 901 and an energy feedback clutch 905. The energy feedback clutch 905 is generally an overrun clutch. There are many ways for the energy generated during lowering the sucker rod to pass through the energy feedback device 9, wherein, preferably, the energy generated during lowering the sucker rod passes through the energy feedback device 9 first and is then transferred to the energy adjustment flywheel 7 via the transmission 8, to realize the accelerated rotation of the energy adjustment flywheel 7; or, the energy generated during lowering the sucker rod passes through the energy feedback device 9 first, then passes through the rotary spindle 2, and is finally transferred to the energy adjustment flywheel 7 via the transmission 8, to realize the accelerated rotation of the energy adjustment flywheel 7. In this embodiment, the energy generated during lowering the sucker rod passes through the energy feedback device 9 first and is then transferred to the energy adjustment flywheel 7 via the transmission 8, to realize the accelerated rotation of the energy adjustment flywheel 7. During the up and down stroke of the sucker rod, the rotation direction of the rotary spindle 2 keeps unchanged, and the rotation direction of the energy adjustment flywheel also keeps unchanged.

In this embodiment, the energy feedback device 9 comprises a driving shaft 901 and a first driving wheel 903 and a second driving wheel 904 disposed on the driving shaft 901. The first driving wheel 903 is connected to the driving shaft 901 via an energy feedback clutch 905. That is, one of the first driving wheel 903 and the second driving wheel 904 is connected to the driving shaft 901 via the energy feedback clutch 905, while the other one is fixedly connected to the driving shaft. In this embodiment, the first driving wheel 903 and the roller driving wheel 6 are a pair of meshed gears;

furthermore, the first driving wheel 903 is connected to the driving shaft 901 via the energy feedback clutch 905. The energy feedback clutch 905 is a sprag overturn clutch. The second driving wheel 904 is connected to the transmission 8. For the connection of the second driving wheel 904 with the transmission 8, the second driving wheel 904 may be connected to the lower-speed end of the transmission 8 or another end other than the high-speed end of the transmission, particularly in the case that the transmission 8 is a multi-stage transmission. In this embodiment, the second driving wheel 904 is a gear meshed with a gear at the lower-end of the transmission 8. A transition wheel 902 is fixed on the rotary spindle 2. The transition wheel 902 may be a gear meshed with a gear at the lower-end of the transmission 8. An electric motor gear 13, meshed with a gear at the high-speed end of the transmission 8, is mounted on the output shaft of the electric motor 1 via an electric motor clutch 12. Of course, the electric motor 1 is allowed to be connected to a shaft at the high-speed end of the transmission 8 via the electric motor clutch 12.

The working principle of the wind-directly-driven oil pumping machine will be described in brief as below with reference to this embodiment. The oil pumping machine provided by this embodiment is mounted on a pedestal capable of rotating at 360°. Before raising the sucker rod, the energy adjustment flywheel 7 starts to accumulate energy. The blade 3 drives the rotary spindle 2 to rotate. A transition wheel is fixed on the rotary spindle 2. The transition wheel may be a gear meshed with a gear at the lower-end of the transmission 8. The energy adjustment flywheel 7 is driven via the transmission 8 to rotate by the rotation of the transition wheel. Alternatively, the electric motor may be started for giving assistance. When the rotation speed of the energy adjustment flywheel 7 reaches a set value, under the control of the control device 14, the clutches 5 begin to act and turn into a joined state from a separated state, so that the rotary spindle 2 is joined with the lifting roller 4. The lifting roller 4 drives the sucker rod to rise to enter an up stroke. During the up stroke, a part of energy of the energy adjustment flywheel 7 is consumed, and the rotation speed is lowered. When the sucker rod is raised to a predetermined height, the control device 14 instructs the clutches 5 to separate from each other according to a preset program, so that the rotary spindle 2 is separated from the lifting roller 4. Due to the gravity of the sucker rod, the sucker rod falls to enter a down stroke and drags the lifting roller 4 to drive the roller driving wheel 6 to rotate reversely, so that the roller driving wheel 6 drives the first driving wheel 903 to rotate. Furthermore, the rotation speed of the first driving wheel increases with the increase of the falling speed of the sucker rod. When the rotation speed of the second riving wheel 904 is the same as that of the first driving wheel 905, due to the overrun clutch, the second driving wheel 904 and the first driving wheel 905 rotate coaxially at a same speed, further to drive the energy adjustment flywheel 7 to rotate faster via the transmission 8, so that the energy is stored. Meanwhile, the speed of free fall of the sucker rod is controlled, so that the sucker rod falls stably and the impact force of the sucker rod is minimized.

Due to the instability of the wind speed, according to the monitor to the rotation speed of the energy adjustment flywheel 7, an on point and an off point of the electric motor 1, an on point of the generator 10 and an on point the brake are set in the programming logic of the control device 14, respectively, along with programs about rotation speed of the energy adjustment flywheel 7 from small to large. When the rotation speed of the energy adjustment flywheel 7 is from large to small, an off point of the brake and an off point of the generator 10 are set. As the wind speed will be finally reflected on the rotation speed of the energy adjustment flywheel 7, the stable and safe operation of the oil pumping machine may be ensured at an instable wind speed. The stroke length of the wind-directly-driven oil pumping machine provided by this embodiment is not constricted to the structure due to its structural characteristics, so the wind-directly-driven oil pumping machine is applied to not only oil wells of general stroke length but also oil wells of a stroke above 10 m.

Embodiment 2

Figure 2:
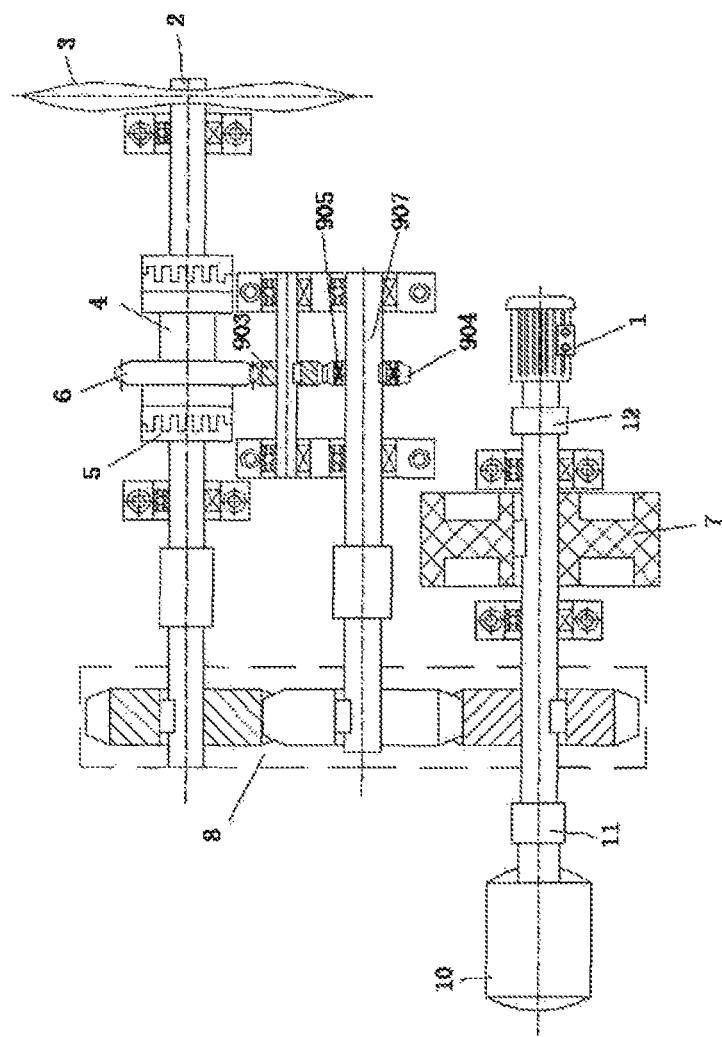
FIG. 2 is a structure diagram of Embodiment 2 of the present invention.

Referring to FIG. 2, in this embodiment, the energy feedback device 9 is of another structure, and the transmission 8 will change in structure with the structure change of the energy feedback device 9. The energy feedback device 9 comprises a rotating shaft 907, a first driving wheel 903 and a second driving wheel 904. The transmission 8 is a multi-stage transmission, and further has a plurality of connecting ends other than the high-speed end and the low-speed end. The connecting shaft of one of the connecting ends is fixedly connected to the rotating shaft 907. Of course, the rotating shaft 907 may be a part extending from the connecting end. The rotating shaft 907 is connected to the second driving wheel 904 via an energy feedback clutch 905, wherein, the energy feedback clutch 905 is a sprag overrun clutch. All the first driving wheel 903, the second driving wheel 904 and the roller driving wheel 6 are gears. The first driving wheel 903 is positioned between the roller driving wheel 6 and the second driving wheel 904 and meshed with both the roller driving wheel 6 and the second driving wheel 904. The first driving wheel 903 is fixed on a driving shaft and able to rotate. The electric motor 1 is connected to a shaft at the high-speed end of the transmission 8 via an electric motor clutch 12. The remaining is the same as Embodiment 1.

Embodiment 3

Figure 3:
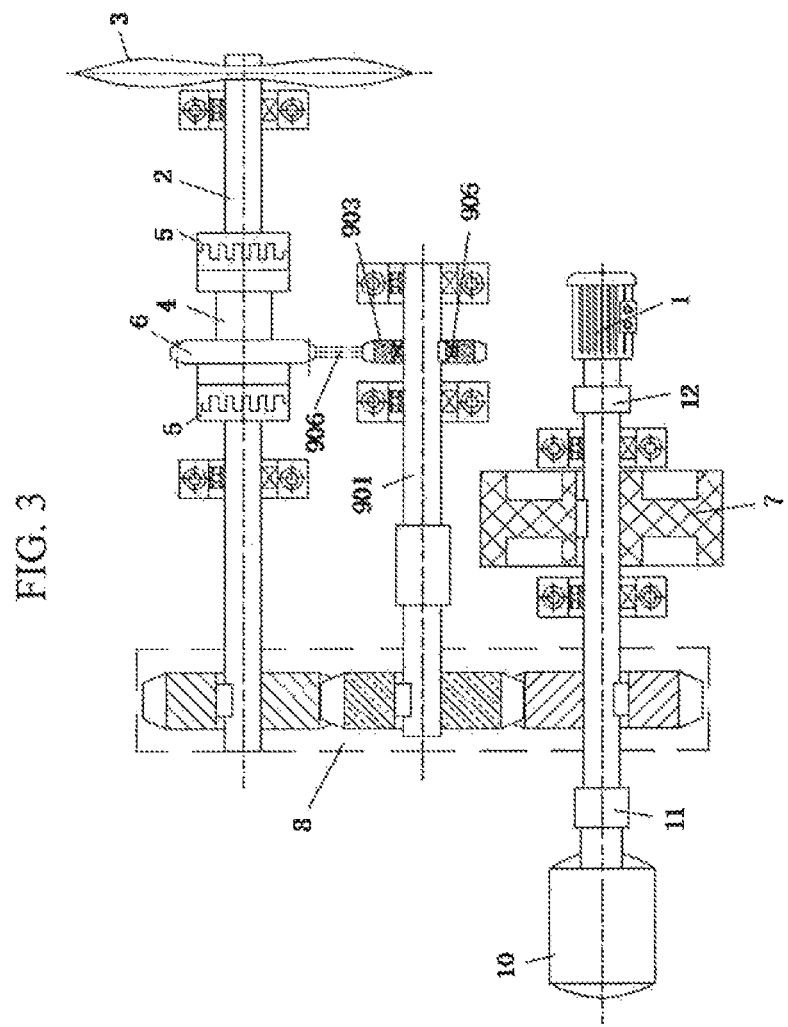
FIG. 3 is a structure diagram of Embodiment 3 of the present invention.

Referring to FIG. 3, the energy feedback device 9 comprises a driving shaft 901. The driving shaft 901 is connected to a first driving wheel 903 via an energy feedback clutch 905. The transmission 8 further has a plurality of connecting ends other than the high-speed end and the low-speed end. The connecting shaft of one of the connecting ends is fixedly connected to the driving shaft 901. Of course, the driving shaft 901 may be a part extending from the connecting end. The energy feedback clutch 905 is an overrun clutch. The first driving wheel 903 is connected to the roller driving wheel 6 via a driving belt 906. The remaining is the same as Embodiment 2.

Embodiment 4

Figure 4:
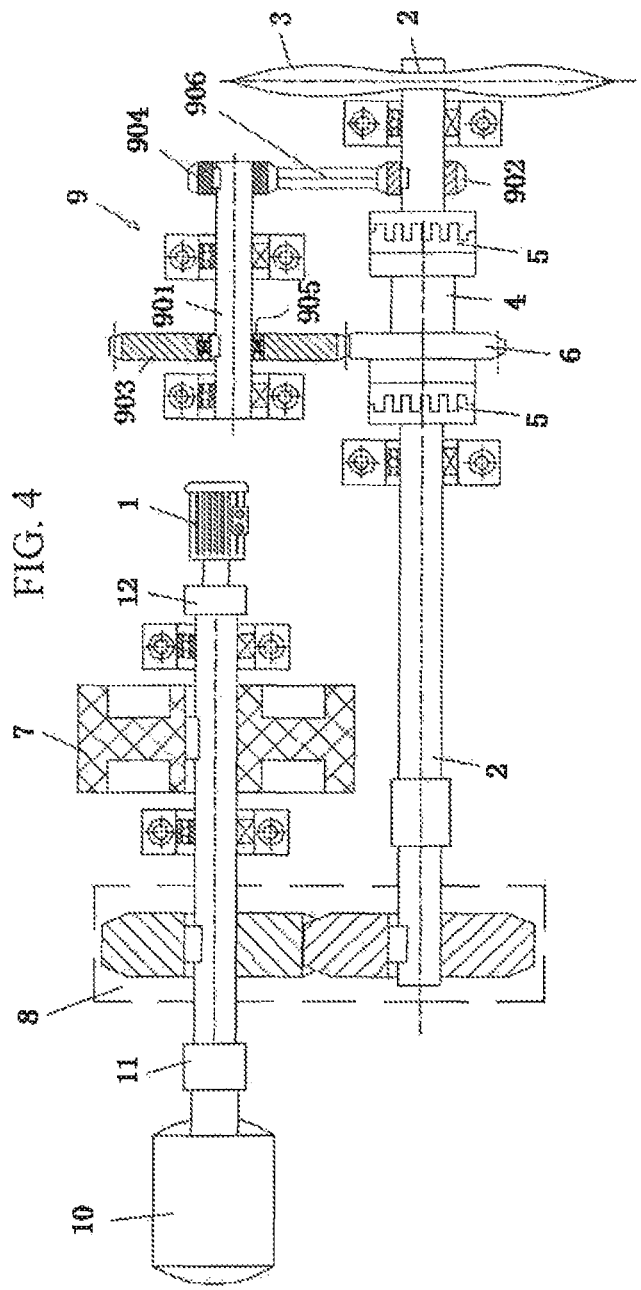
FIG. 4 is a structure diagram of Embodiment 4 of the present invention.

Referring to FIG. 4, the energy feedback device 9 comprises a driving shaft 901, a transition wheel 902 fixedly connected to the rotary spindle 2, and a first driving wheel 903 and a second driving wheel 904 disposed on the driving shaft 901. The first driving wheel 903 is connected to the driving shaft 901 via an energy feedback clutch 905. The second driving wheel 904 is directly fixed on the driving shaft 901. The first driving wheel 903 and the roller driving wheel 6 are a pair of meshed gears. The second driving wheel 904 is connected to the transition wheel 902 via a driving belt 906. The electric motor 1 is connected to a shaft at the high-speed end of the transmission 8 via an electric motor clutch 12. The energy generated during lowering the sucker rod passes through the energy feedback device 9, then passes through the rotary spindle 2 and is transferred to the energy adjustment flywheel 7 via the transmission 8, to realize the accelerated rotation of the energy adjustment flywheel 7. The remaining is the same as Embodiment 1.

Embodiment 5

Figure 5:
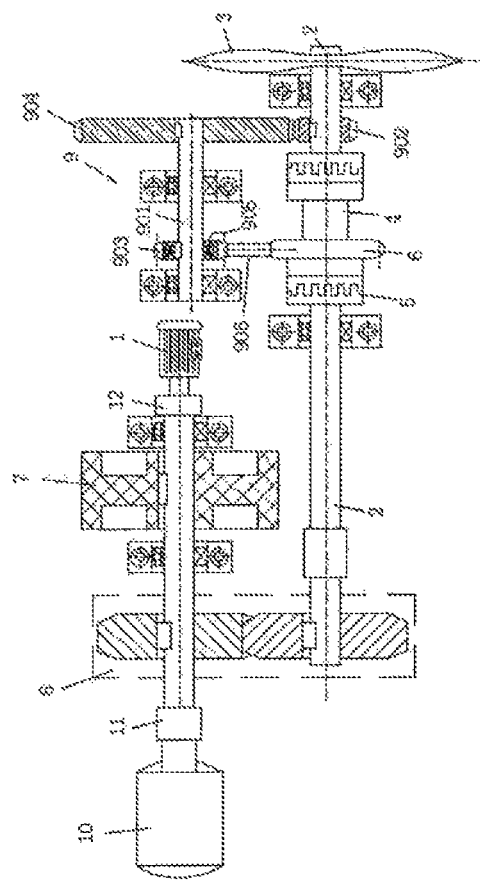
FIG. 5 is a structure diagram of Embodiment 5 of the present invention.

Referring to FIG. 5, the energy feedback device 9 comprises a driving shaft 901, a transition wheel 902 fixedly connected to the rotary spindle 2, and a first driving wheel 903 and a second driving wheel 904 disposed on the driving shaft 901. The first driving wheel 903 is connected to the driving shaft 901 via an energy feedback clutch 905. The second driving wheel 904 and the transition wheel 902 are a pair of meshed gears. The first driving wheel 903 is connected to the roller driving wheel 6 via a driving belt 906. The remaining is the same as Embodiment 4.

Embodiment 6

Figure 6:
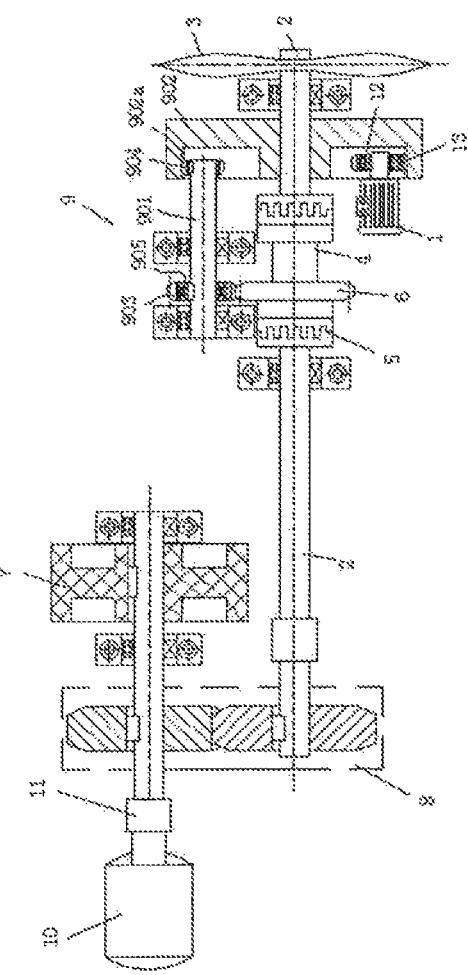
FIG. 6 is a structure diagram of Embodiment 6 of the present invention.

Referring to FIG. 6, the energy feedback device 9 comprises a driving shaft 901, a transition wheel 902 fixedly connected to the rotary spindle 2, and a first driving wheel 903 and a second driving wheel 904 disposed on the driving shaft 901. The first driving wheel 903 is connected to the driving shaft 901 via an energy feedback clutch 905. The second driving wheel 904 is directly fixed on the driving shaft 901. All the first driving wheel 903, the second driving wheel 904 and the roller driving wheel 6 are gears. The first driving wheel 903 is meshed with the roller driving wheel 6. The transition wheel 902 is provided with internal teeth 902a. The second driving wheel 904 is meshed with the internal teeth 902a. An electric motor gear 13, meshed with the internal teeth 902a, is mounted on the output shaft of the electric motor 1 via an electric motor clutch 12. The remaining is the same as Embodiment 4.

Embodiment 7

Figure 7:
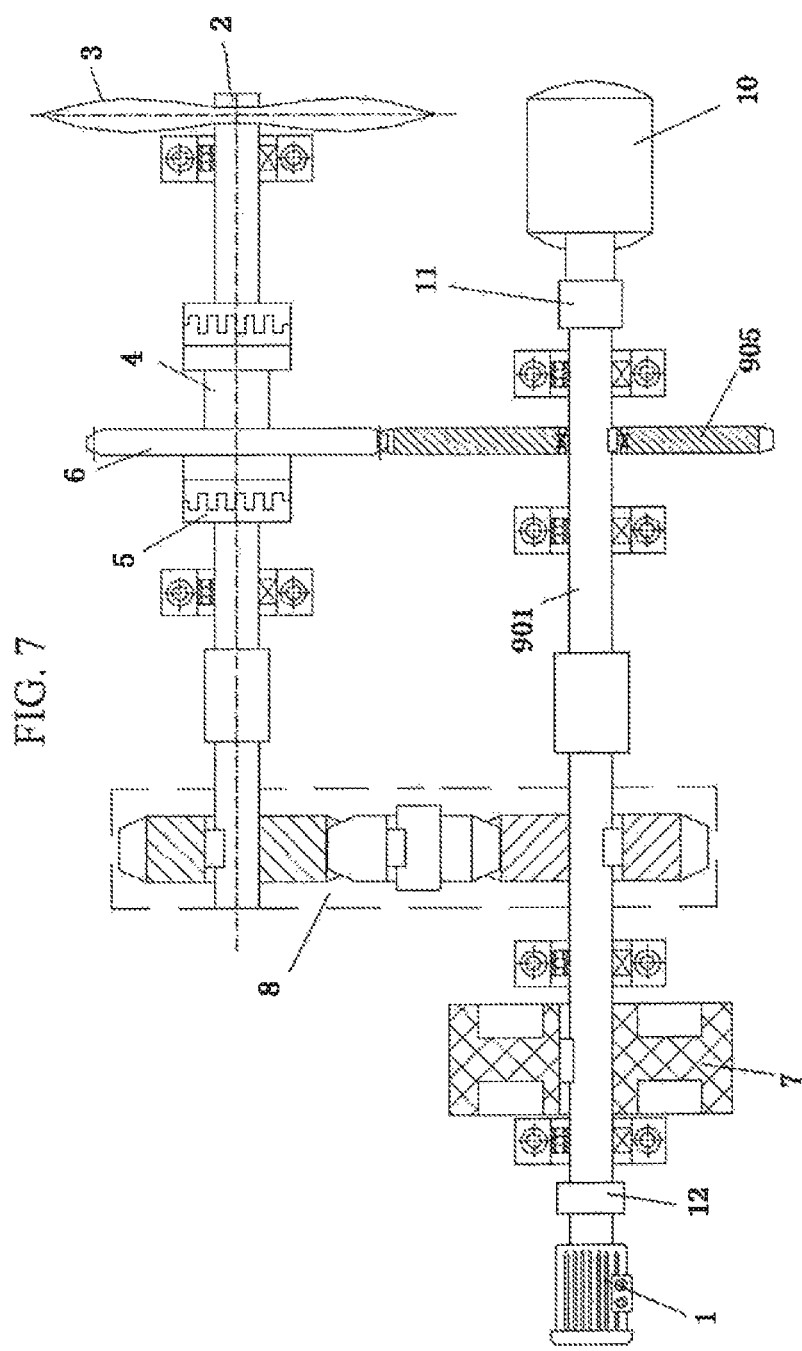
FIG. 7 is a structure diagram of Embodiment 7 of the present invention.

Referring to FIG. 7, the roller driving wheel 6 is a gear. The energy feedback device 9 comprises a driving shaft 901 and an energy feedback clutch 905 disposed on the driving shaft. The transmission 8 at least has a low-speed end and a high-speed end. A connecting shaft at the high-speed end of the transmission 8 is fixedly connected to the driving shaft 901. The transmission 8 may further have a plurality of connecting ends other than the low-speed end and the high-speed end. The driving shaft 901 may be fixedly connected to the connecting shaft of one of the connecting ends. Of course, the driving shaft 901 may be a part extending from the connecting end. The energy feedback clutch 905 is preferably an overrun clutch. When the energy feedback clutch 905 is an overrun clutch, a first driving wheel, meshed with the roller driving wheel, is mounted on the energy feedback clutch 905. The remaining is the same as Embodiment 3.

The foregoing description just illustrates the present invention to enable an ordinary person skilled in the art to implement the solutions perfectly, and is not intend to limit the present invention. For those skilled in the art, various modifications may be made as required without creative efforts to these embodiments after reading the specification. However, these uncreative modifications, as long as within the scope defined by the claims of the present invention, shall be protected by the Patent Law.

The invention claimed is:

1. A wind-directly-driven oil pumping machine, comprising:
    an electric motor;
    a control device;
    a rotary spindle;
    a blade fixedly connected to the rotary spindle;
    a sucker rod;
    a lifting roller, used for raising and lowering the sucker rod, a separation or joining of the rotary spindle with the lifting roller being realized via a clutch;
    a roller driving wheel, the roller driving wheel and the lifting roller being fixedly connected;
    an energy adjustment flywheel;
    a transmission, a low-speed end of which is connected to the rotary spindle while a high-speed end of which is connected to the energy adjustment flywheel;
    an energy feedback device for transferring to the energy adjustment flywheel via the transmission energy generated during the lowering of the sucker rod, the energy of the energy adjustment flywheel then being transferred to the lifting roller for raising the sucker rod; and
    a generator connected to the high-speed end of the transmission,
    wherein the energy feedback device comprises a driving shaft and a first driving wheel and a second driving wheel disposed on the driving shaft, the first driving wheel or the second driving wheel being connected to the driving shaft via an energy feedback clutch, the first driving wheel and the roller driving wheel being a pair of meshed gears, the second driving wheel being connected to the transmission.

2. The wind-directly-driven oil pumping machine according to claim 1, characterized in that the energy feedback device (9) comprises a rotating shaft (907), a first driving wheel (903) and a second driving wheel (904), the rotating shaft (907) being connected to the second driving wheel (904) via an energy feedback clutch (905), all the first driving wheel (903), the second driving wheel (904) and the roller driving wheels (6) being gears, the first driving wheel (903) being positioned between the roller driving wheel (6) and the second driving wheel (904) and being meshed with both the roller driving wheel (6) and the second driving wheel (904), the second driving wheel (904) being connected to the transmission (8).

3. The wind-directly-driven oil pumping machine according to claim 1, characterized in that the energy feedback device (9) comprises a driving shaft (901) and a first driving wheel (903), the driving shaft (901) being connected to the first driving wheel (903) via an energy feedback clutch (905), the first driving wheel (903) being connected to the roller driving wheel (6) via a driving belt (906).

4. The wind-directly-driven oil pumping machine according to claim 1, characterized in that the energy feedback device (9) comprises a driving shaft (901), a transition wheel (902) fixedly connected to the rotary spindle (2), and a first driving wheel (903) and a second driving wheel (904) disposed on the driving shaft (901), the first driving wheel (903) or the second driving wheel (904) being connected to the driving shaft (901) via an energy feedback clutch (905), the first driving wheel (903) and the roller driving wheel (6) being a pair of meshed gears, the second driving wheel (904) being connected to the transition wheel (902) via a driving belt (906).

5. The wind-directly-driven oil pumping machine according to claim 1, characterized in that the energy feedback device (9) comprises a driving shaft (901), a transition wheel (902) fixedly connected to the rotary spindle (2), and a first driving wheel (903) and a second driving wheel (904) disposed on the driving shaft (901), the first driving wheel (903) or the second driving wheel (904) being connected to the driving shaft (901) via an energy feedback clutch (905), the second driving wheel (904) and the transition wheel (902) being a pair of meshed gears, the first driving wheel (903) being connected to the roller driving wheel (6) via a driving belt (906).

6. The wind-directly-driven oil pumping machine according to claim 1, characterized in that the energy feedback device (9) comprises a driving shaft (901), a transition wheel (902) fixedly connected to the rotary spindle (2), and a first driving wheel (903) and a second driving wheel (904) disposed on the driving shaft (901), the first driving wheel (903) or the second driving wheel (904) being connected to the driving shaft (901) via an energy feedback clutch (905), all the first driving wheel (903), the second driving wheel (904) and the roller driving wheel (6) being gears, the first driving wheel (903) being meshed with the roller driving wheel (6), the transition wheel (902) being provided with internal teeth (902a), the second driving wheel (904) being meshed with the internal teeth (902a).

7. The wind-directly-driven oil pumping machine according to claim 6, characterized in that an electric motor gear (13), meshed with the internal teeth (902a), is mounted on the output shaft of the electric motor (1); or, the output shaft of the electric motor (1) is connected to the transmission (8) via an electric motor clutch (12).

8. The wind-directly-driven oil pumping machine according to claim 1, characterized in that the energy feedback clutch (905) is an overrun clutch.

9. The wind-directly-driven oil pumping machine according to claim 1, characterized in that the energy generated during lowering the sucker rod passes through the rotary spindle first and is then transferred to the energy adjustment flywheel via the transmission to utilize the accelerated rotation of the energy adjustment flywheel.

* * * * *